United States Patent [19]
Kobayashi

[11] 3,879,138
[45] Apr. 22, 1975

[54] ELECTRICAL LIGHT-MEASURING SYSTEMS

[75] Inventor: Katsumi Kobayashi, Tokyo, Japan

[73] Assignee: Kabushiki Kaisha Yashica, Tokyo, Japan

[22] Filed: May 29, 1973

[21] Appl. No.: 364,738

[30] Foreign Application Priority Data
May 31, 1972   Japan................................ 47-63331

[52] U.S. Cl................................. 356/226; 250/206
[51] Int. Cl. ............................................... G01j 1/44
[58] Field of Search ............ 356/226, 218; 250/206, 250/214

[56] References Cited
UNITED STATES PATENTS
| | | | |
|---|---|---|---|
| 2,406,716 | 8/1946 | Sweet.................................. | 356/226 |
| 3,603,799 | 9/1971 | Nobusawa........................... | 250/214 |
| 3,700,337 | 10/1972 | Fujii.................................... | 356/218 |

*Primary Examiner*—Ronald L. Wibert
*Assistant Examiner*—Conrad Clark
*Attorney, Agent, or Firm*—Steinberg & Blake

[57] ABSTRACT

An electrical light-measuring system capable of effectively measuring even relatively small amounts of light. A meter circuit is provided with an indicating meter which indicates the light intensity. This meter circuit is electrically connected with a current-amplifier circuit which controls the current of the meter circuit. This current-amplifier circuit has an input, and a constant-voltage circuit has an output, a photosensitive element being connected between the latter output and input for receiving the light which is to be measured. The meter circuit is capable of being adjusted for adjusting the relationship between the current which flows through the meter and the resistance of the photosensitive element.

3 Claims, 5 Drawing Figures

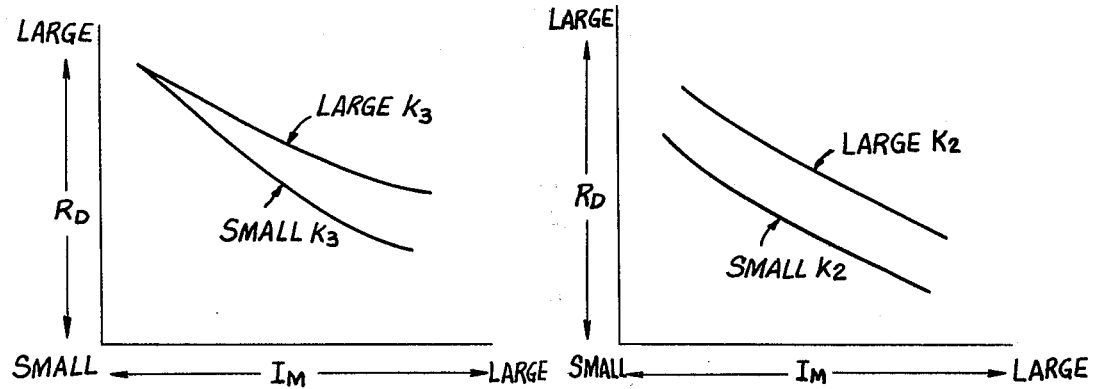
Fig. 3A
Fig. 3B
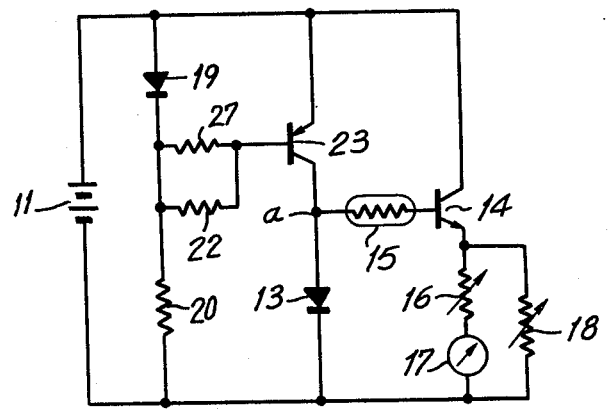
Fig. 4

ELECTRICAL LIGHT-MEASURING SYSTEMS

BACKGROUND OF THE INVENTION

The present invention relates to electrical light-measuring systems.

Thus, the present invention relates to electrical exposure meter systems capable of measuring the light intensity at an object which is to be photographed by a camera, for example.

Particular difficulties are encountered with conventional light-measuring systems of the above type because of the fact that an extremely feeble current is provided when there is a relatively low light intensity at the object which is to be photographed. Such systems require meters which have movable components, and such components operate in a mechanically improper manner when only a feeble current can be achieved. As a result of these considerations, the conventional systems do not operate uniformly throughout the entire range of light which is measured, and in addition the range of light which can be properly measured is limited to a range which is less than that which is required for making photographs under all lighting conditions which are likely to be encountered.

SUMMARY OF THE INVENTION

It is accordingly a primary object of the present invention to provide a light-measuring system which will avoid the above drawbacks.

In particular, it is an object of the invention to provide a light-measuring system which makes it possible to obtain a relatively large current at a relatively low voltage even under conditions where the object to be photographed is illuminated at a relatively low light intensity.

Thus, it is an object of the present invention to increase considerably the range of light which can be measured with systems of the above type.

In addition, it is an object of the present invention to provide a system which enables the movable components of a meter to move in a mechanical manner with great reliability even under conditions of low light.

In addition, it is an object of the invention to provide a light-measuring system which will eliminate any lack of uniformity in the operation of the system under widely varying lighting conditions.

Furthermore, it is an object of the present invention to provide circuitry for accomplishing the above objects and utilizing simple rugged elements which are very reliable in operation and which are capable of operating in such a way that they are not undesirably influenced by such factors as temperature fluctuations.

In accordance with the invention, the light-measuring system includes a meter circuit means provided with an indicating meter for indicating the light intensity. A current-amplifier circuit means is electrically connected with the meter circuit means to control the current flowing therethrough. This current-amplifier circuit means has an input. A constant-voltage circuit means has an output, and between the latter output and the above input there is connected a photosensitive means which receives the light which is to be measured. The meter circuit means includes in addition an adjusting means for adjusting the relationship between the resistance of the photosensitive means and the current which flows through the indicating meter.

BRIEF DESCRIPTION OF DRAWINGS

The invention is illustrated by way of example in the accompanying drawings which form part of this application and in which:

FIG. 3A is a graph illustrating one possible manner in which the relationship between the resistance of a photosensitive means and the current flowing through the meter can be regulated;

FIG. 3B is a graph illustrating another possible adjustment of the relationship between the resistance of a photosensitive means and the current flowing through an indicating meter; and FIG. 4 is a wiring diagram of another embodiment of a light-measuring circuit according to the present invention.

DESCRIPTION OF PREFERRED EMBODIMENTS

Figure 1:
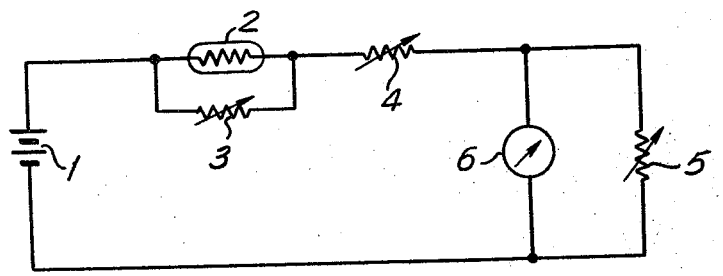
FIG. 1 is a circuit illustrating the prior art.

Referring first to FIG. 1, there is illustrated therein a light-measuring system as conventionally used. In the circuit of FIG. 1 there is a battery 1 to provide a source of energy. The circuit also includes a photosensitive means 2 which receives the light which is to be measured. Resistances 3 and 4 are provided for correction of $\gamma$. In addition to the variable resistors 3 and 4 there is a variable resistor 5 for switching purposes, and the circuit includes the indicating meter 6 across which the variable resistor 5 is connected in parallel therewith.

As may be seen from FIG. 1, in this conventional light-measuring system, an extremely feeble current is provided when the light has a relatively low intensity since the photosensitive means 2 and the indicating meter 6, which may be a moving coil instrument such as a galvanometer, are connected in series with each other. As a result there is a disadvantage in that the movable components of the meter which are required to move mechanically operate very poorly under conditions of low current. In addition, with this conventional light-measuring system, operation of the switching resistance 5 under regulation of the variable resistors 3 and 4 which correct $\gamma$ produces a current stress with the result that the range within which the switching operations may be carried out by the variable resistor 5 is limited to the order of 3.5 EV.

With the light-measuring systems of the invention described below it is possible to avoid the above drawbacks of the conventional systems. Thus, with the systems of the invention it is possible to use a relatively intense current at low voltage so as to enable the indicating meter to be properly driven, while smoothing out and facilitating $\gamma$ characteristic correction and exposure switching of the photosensitive element which receives the light while enlarging the range of exposure switching.

Figure 2:
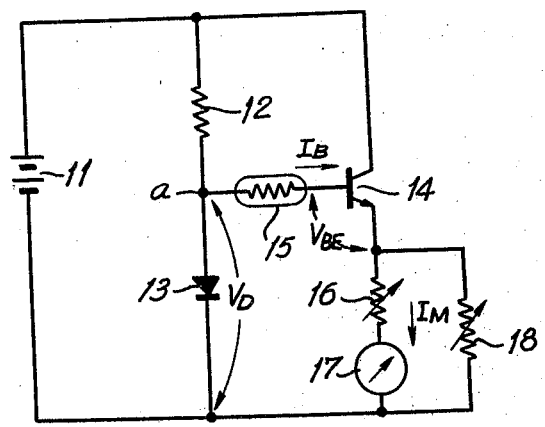
FIG. 2 is a circuit of a light-measuring system in accordance with the present invention.

Referring to FIG. 2, a basic embodiment of the present invention is illustrated therein. The light-measuring system of FIG. 2 includes the source battery 11 which is electrically connected with a constant-voltage circuit means formed by the series-connected voltage divider resistance 12 and the constant voltage element 13. A current-amplifier circuit means is formed by the transistor 14 which is emitter-follower connected and which has an input at its base. The junction $a$ between the voltage divider resistance 12 and the constant voltage element 13 forms the output of the constant-voltage circuit means 12,13. Between this output $a$ and the input formed by the base of transistor 14 there is connected a photosensitive means 15 in the form of an element such as a cadmium sulfide element connected in the manner shown in FIG. 2 between the base of the transistor 14 and the junction $a$.

The current-amplifier circuit means 14 serves to control the current of a meter circuit means which is electrically connected to the emitter of the transistor 14. This meter circuit means includes the indicating meter 17 which, for example, may take the form of a moving coil instrument such as a galvanometer.

In order to adjust the relationship between the resistance of the photosensitive means 15 and the current which flows through the indicating meter 17, a pair of variable resistors are provided in the example of FIG. 2, these variable resistors including variable resistor 16 which is connected in series with the meter 17 between the latter and the emitter of transistor 14. Thus, the variable resistor 16 forms a series variable resistor. A parallel variable resistor 18 is connected across the series-connected series variable resistor 16 and indicating meter 17 in parallel therewith as illustrated in FIG. 2.

The driving current which passes through the indicating meter can be calculated in accordance with the following:

Current $I_B$ which passes through the photoreceiver 15 is obtained as follows:

$$I_B = \frac{V_D - V_{BE}}{R_D + (h_{FE} + 1) \cdot \frac{R_{18}(R_{16} + R_M)}{R_{16} + R_M + R_{18}}} \quad \ldots (1)$$

where $V_D$: terminal voltage of the constant voltage element 13, $V_{BE}$: voltage across base-emitter of the transistor 14, $h_{FE}$: amplification factor of the transistor 14, $R_D$: resistance value of the photoreceiver element 15, $R_{16}$, $R_{18}$: resistance values of the adjustable resistances 16, 18, respectively, and $R_M$: resistance value of the indicating meter 17.

Accordingly, current $I_M$ which passes through the indicating meter 17 is obtained as follows:

$$I_M = I_B \cdot (h_{FE} + 1) \cdot \frac{R_{18}}{R_{16} + R_M + R_{18}}$$

$$= \frac{(V_D - V_{BE})(h_{FE} + 1)}{\frac{R_{16} + R_{18} + R_M}{R_{18}} R_D + (h_{FE} + 1)(R_{16} + R_M)} \quad \ldots (2)$$

Assumed that $(V_D - V_{BE})(h_{FE} + 1) = K_1$, $$\frac{R_{16} + R_{18} + R_M}{R_{18}} = K_2, \text{ and}$$

$(h_{FE} + 1)(R_{16} + R_M) = K_3$, $$I_M = \frac{K_1}{K_2 R_D + K_3} \quad \ldots (3)$$

It will be readily understood from the latter equation (3) that $I_M$ depends upon a particular stop value relative to the photosensitive means 15, as is apparent from the following:

a. Proper choice of the amplification factor of transistor 14 will provide $I_M$ of relatively high intensity (approximately 10 times that which can be achieved with a conventional circuit as shown in FIG. 1). Thus, it is possible to provide an indicating meter which is mechanically strong, utilizing a large output current with relatively low voltage.

b. When the light intensity at the object to be photographed is relatively low, relationship between $I_M$ and $R_D$ is expressed by $$K_2 R_D \gg K_3, I_M = \frac{K_1}{K_2 R_D}$$

and, when the light intensity at the object is high, this relation is in accordance with the above-mentioned equation (3) as follows:

$$I_M = \frac{K_1}{K_2 R_D + K_3}$$

This relationship between $I_M$ and $R_D$ may be illustrated by the characteristic curves of FIG. 3A. As may be seen from FIG. 3A, adjustment of the series variable resistor 16 varies $K_3$ and in a corresponding manner the slope of the characteristic curve. It is possible, therefore, to absorb non-uniformity in the operation of the indicating meter 17 and to correct non-uniformity in the operation of the photosensitive means 15 based upon the characteristic by adjustment of the variable resistor 16. Adjustment on the order of 1.5 EV is possible.

c. Variation of $K_2$ by adjustment of the variable resistor 18 displaces the characteristic curve without changing its slope, as is indicated in FIG. 3B, since $K_2$ is the proportional constant of $R_D$. Accordingly, it is possible to achieve exposure switching such as ASA adjustment conversion as well as to correct non-uniformity in this parallel displacement caused by operation of the indicating meter 17 and the photosensitive means 15 by adjustment of the variable resistor 18. While $K_3$ can vary infinitely on a theoretical basis, actually it can vary sufficiently to attain exposure switching on an order of between 5 and 6 EV. Such a range of exposure switching can be, of course, enlarged by use of suitable means such as a filter at the operating or working surface of the photosensitive element 15.

FIG. 4 illustrates another embodiment of the invention where the voltage variation characteristic and the temperature characteristic at a low voltage range (for example on the order of 3 to 2 V) are considered. In this embodiment, the constant voltage circuit means includes the constant voltage element 19 connected in series with a voltage divider resistance 20. A pair of junctions in the series connection between elements 19 and 20 are respectively connected with a pair of resistors 21 and 22 which as illustrated are in parallel with each other and electrically connected to the base of a transistor 23 which is in series with the constant voltage element 13. The current passing through the constant voltage element 13 is then selected in such a way that the terminal voltage of constant voltage element 13 is always maintained constant independently of voltage variation at the battery source 11.

The temperature characteristic is compensated by the combination of the constant voltage element 19 and the transistor 23 as well as the combination of the constant voltage element 13 and the transistor 14. In addition, the temperature balance is maintained by use of a thermistor for the resistance 22 in combination with the elements 19, 23 and 13, 14.

Thus, in accordance with the invention, as is apparent from the above, it is possible to obtain a large current at a relatively low voltage even when the object which is to be photographed is illuminated with a relatively low light intensity so that it is necessary to operate in a low range of brightness. It becomes possible with the invention to utilize for the indicating meter robust mechanical elements which will move reliably with the required force even when operating at relatively low light intensities, so as a result with the present invention it is not essential to use extremely delicate components for the meter, as is necessitated by the requirement of operating with conventional systems at relatively low light intensities. In addition, it is possible with the invention to enlarge the range of exposure switching as compared with previously known exposure meter systems. In addition, lack of uniformity in the operation of the system, resulting from operation of the indicating meter and the photosensitive means can be very readily corrected by proper adjustment of the variable resistors. As a result, the features of the present invention are of great practical value.

It is to be noted that the constant voltage elements such as elements 13 and 19 may each be formed by a diode, a varistor, or a Zener diode.

What is claimed is:

1. In an electrical light-measuring system, meter circuit means including an indicating meter for indicating light intensity, current-amplifier circuit means electrically connected with said meter circuit means for controlling the current thereof, said current-amplifier circuit means having an input, constant voltage circuit means having an output, and photosensitive means for receiving the light which is to be measured, said photosensitive means being electrically connected between said output and input, said meter circuit including a series variable resistor connected in series with said indicating meter for varying the slope of the relationship between the resistance of said photosensitive means and the current which flows through said indicating meter, and a parallel variable resistor connected across the series connected series variable resistor and indicating meter in parallel therewith for changing the range of said relationship, said current-amplifier circuit means including a transistor having a base connected to said photosensitive means and an emitter connected in series with said series variable resistor and indicating meter.

2. The combination of claim 1 and wherein said constant voltage circuit means includes a constant voltage element and a voltage divider resistance connected in series and having therebetween a junction which forms said output connected to said photosensitive means.

3. The combination of claim 1 and wherein said constant voltage circuit means includes a first constant voltage element and a transistor connected in series therewith and having in the series connection a junction which forms said output, a second constant voltage element and a voltage dividing resistance connected in series with each other and being in parallel with said first constant voltage element and said transistor connected in series therewith, said second constant voltage element and voltage divider resistance having a pair of junctions in the series connection therebetween, and a pair of resistors respectively connected to said pair of junctions and connected in parallel to each other and to the base of said transistor which is in series with said first constant voltage element.

* * * * *